US008619141B2

(12) United States Patent
Anderson

(10) Patent No.: US 8,619,141 B2
(45) Date of Patent: Dec. 31, 2013

(54) PORTAL MANAGEMENT

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 1043 days.

(21) Appl. No.: 12/644,706

(22) Filed: Dec. 22, 2009

(65) Prior Publication Data

US 2011/0149079 A1 Jun. 23, 2011

(51) Int. Cl.
*H04N 7/18* (2006.01)

(52) U.S. Cl.
USPC .......................................... 348/156; 348/143

(58) Field of Classification Search
USPC ........... 348/143, 148, 156; 382/118; 235/382; 701/36
See application file for complete search history.

(56) References Cited

U.S. PATENT DOCUMENTS 6,513,015 B2 1/2003 Ogasawara
7,006,672 B2 * 2/2006 Sato et al. ..................... 382/118
2004/0100386 A1 5/2004 Tendler
2004/0107030 A1 * 6/2004 Nishira et al. .................. 701/36
2004/0119822 A1 * 6/2004 Custer et al. .................. 348/148
2006/0164208 A1 7/2006 Schaffzin et al.
2009/0101709 A1 * 4/2009 Nonaka ......................... 235/382

FOREIGN PATENT DOCUMENTS

WO 2009/087412 7/2009

OTHER PUBLICATIONS

"Robo-Gate" 1 page, retrieved Nov. 2009 http://www.robotlawnmower.ca/robogate.cfm?cfid=1354559&cftoken=25997303.
European Search Report, Apr. 11, 2011, 6 Pages.

* cited by examiner

*Primary Examiner* — Allen Wong
(74) *Attorney, Agent, or Firm* — Yee & Associates, P.C.

(57) ABSTRACT

The different illustrative embodiments provide an apparatus, a system, and a method for managing a portal. The different illustrative embodiments provide an apparatus comprising a locking system, a detection system, and a portal access system. The locking system is for a portal having a first side and a second side. The portal is configured to swing about an axis through the first side between an opened position and a closed position. The detection system is configured to detect when a robotic vehicle is located within a selected distance of the portal. The portal access system unlocks the portal when the portal is in the closed position and the robotic vehicle is detected within a selected distance of the portal using the detection system.

3 Claims, 7 Drawing Sheets

PORTAL MANAGEMENT

FIELD OF THE INVENTION

The present invention relates generally to portals, and in particular, to an apparatus, system, and method for managing a portal. Even more particularly, the present disclosure relates to an apparatus, system, and method for managing access to an area using a portal.

BACKGROUND OF THE INVENTION

A robotic vehicle may perform various physical tasks within an area. For example, a robotic vehicle may mow grass in a yard. The area may be divided such that the robotic vehicle and/or other objects may not travel between the various portions of the area. Travel between the various portions of the area may be controlled by a portal. A portal is a point of entry to a portion of the area and/or exit from the portion of the area. The portal may control the entry to and exit from the various portions. That is, the portal may allow access to a portion of the area in some examples and prevent access to the portion of the area in other examples.

In one example, a portal may be a gate for a fence that swings open and closed. The gate controls access between two parts of a yard. A robotic vehicle in the form of a robotic lawn mower travels through the gate when it is open to perform mowing operations in different parts of the yard.

SUMMARY

The different illustrative embodiments provide an apparatus comprising a locking system, a detection system, and a portal access system. The locking system is for a portal having a first side and a second side. The portal is configured to swing about an axis through the first side between an opened position and a closed position. The detection system is configured to detect when a robotic vehicle is located within a selected distance of the portal. The portal access system unlocks the portal when the portal is in the closed position and the robotic vehicle is detected within a selected distance of the portal using the detection system.

The different illustrative embodiments also provide a portal access system comprising a portal movement system, a wireless communications unit, a detection system, and a controller. The portal movement system moves a portal between a closed position and an opened position, wherein the portal has a first side and a second side and the portal swings about an axis through the first side between the opened position and the closed position. The wireless communications unit is configured to receive a request to move the portal from a robotic vehicle. The detection system is configured to detect when the robotic vehicle is located within a selected distance of the portal. The controller controls the portal movement system to move the portal between the opened position and the closed position in response to receiving the request using the wireless communications unit and in response to detecting the robotic vehicle within a selected distance of the portal using the detection system.

The different illustrative embodiments also provide a method for managing a portal. It is determined whether a robotic vehicle is within a selected distance of the portal. The portal is unlocked responsive to a determination that the robotic vehicle is within the selected distance of the portal.

The different illustrative embodiments also provide a method for managing a portal. It is determined whether a robotic vehicle is within a selected distance of the portal. The portal is opened responsive to a determination that the robotic vehicle is within the selected distance of the portal.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
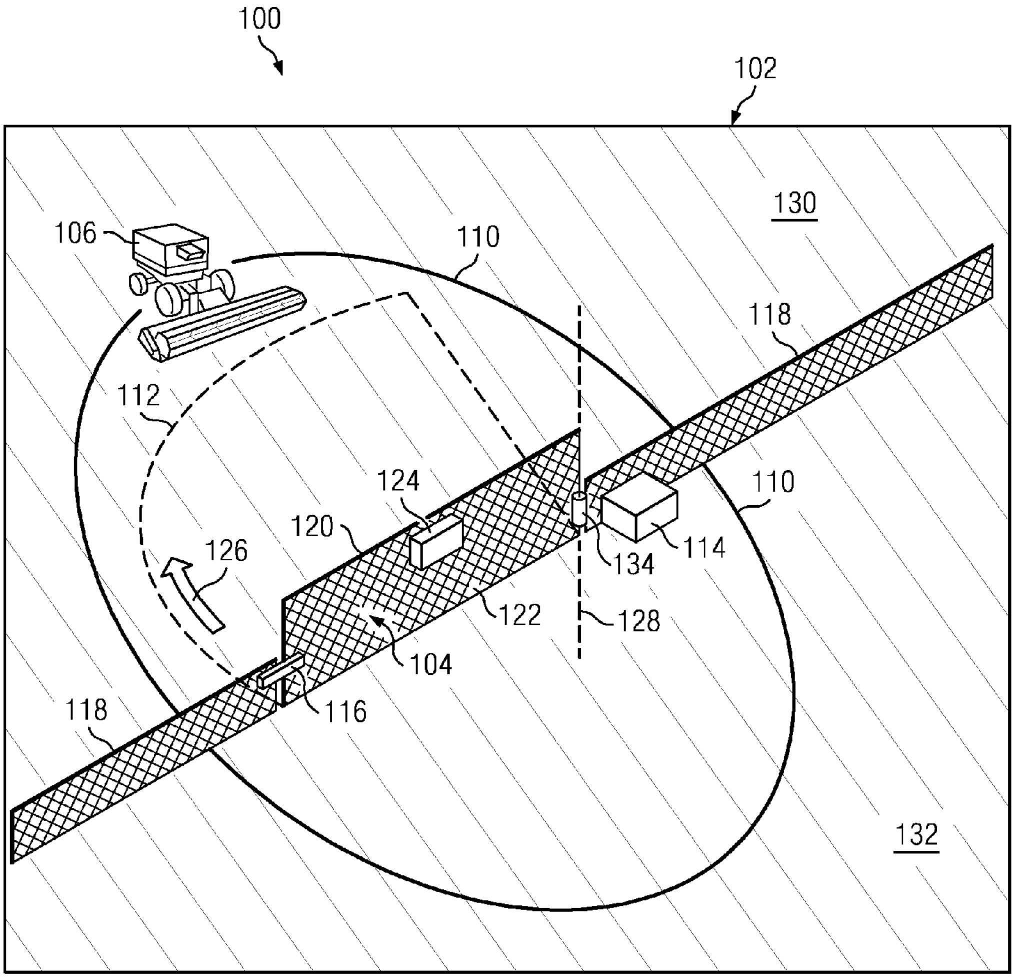
FIG. 1 is an illustration of a portal management environment in which an illustrative embodiment may be implemented.

With reference now to the figures and in particular with reference to FIG. 1, an illustration of a portal management environment is depicted in accordance with an illustrative embodiment. Portal management environment 100 is any type of area in which a portal management system may operate. In an illustrative example, portal management environment 100 manages the operation of a number of portals. A number, as used herein to refer to an item, means one or more items. For example, a number of portals is one or more portals. In these illustrative examples, a portal is a moveable structure that controls access between two areas. A portal may be, for example, a gate, door or other access control device located in or associated with a structure, building, worksite, area, yard, golf course, indoor environment, outdoor environment, and/or any other suitable portal management environment or combination of portal management environments.

In this illustrative example, portal management environment 100 includes lawn 102, fence 118, portal 104, and robotic vehicle 106. Robotic vehicle 106 is traveling from area 130 of lawn 102 to area 132 of lawn 102. Robotic vehicle 106 is a vehicle capable of performing physical tasks in a fully unattended mode or a partially unattended mode. In this illustrative embodiment, robotic vehicle 106 is a robotic mower. Robotic vehicle 106 may be performing a physical task on lawn 102. For example, robotic vehicle 106 may be mowing lawn 102.

In this illustrative example, portal 104 is a gate in fence 118. These structures are used to control access between area 130 and area 132. Fence 118 controls access between area 130 and area 132 by physically blocking travel between area 130 and area 132. Portal 104 also controls access between area 130 and area 132 by physically blocking travel between area 130 and area 132. However, portal 104 swings about axis 128 through side 120 to allow passage between area 130 and area 132.

In this illustrative example, portal 104 swings from the closed position to an open position by swinging in direction 126 using hinge 134. In other illustrative embodiments, portal 104 may swing through side 122 on axis 128. Once portal 104 is in the opened position, portal 104 may swing back to the closed position in a direction opposite direction 126 in this example.

In this illustrative example, lock 116 is engaged on portal 104. Portal 104 is substantially prevented from moving when lock 116 is engaged. Lock 116 is a device that fastens portal 104 to fence 118 and is designed to allow authorized parties to disengage lock 116 but disallow unauthorized parties from disengaging lock 116. Lock 116 may be controlled manually and/or electronically. Controlling lock 116 manually means engaging or disengaging lock 116 using a key, a combination, or another manual method. Controlling lock 116 electronically means engaging or disengaging lock 116 using an actuator, a magnet, or another electronic method. Of course, in some illustrative embodiments, lock 116 is replaced with a latch. A latch is a mechanism that substantially prevents portal 104 from opening when portal 104 is in a closed position.

Detection system 124 is associated with portal 104. As used herein, a first component is considered to be associated with a second component by being secured to the second component, bonded to the second component, fastened to the second component, and/or connected to the second component in some other suitable manner. The first component also may be connected to the second component through using a third component. The first component is also considered to be associated with the second component by being formed as part of and/or an extension of the second component. In this example, detection system 124 is fastened to portal 104.

Detection system 124 is a number of instruments that transmit data to portal access system 114 for detecting the presence of robotic vehicle 106. An instrument may be a camera system, an infrared system, a radio frequency identifier tag reader, or another suitable instrument. In this illustrative example, detection system 124 generates data from area 130. More specifically, detection system 124 generates data from portal 104 to selected distance 110. For example, a camera system in detection system 124 may transmit image information for the area from portal 104 to selected distance 110.

Selected distance 110 is a distance at which detection system 124 detects objects. In this illustrative example, selected distance 110 is a particular distance from portal 104 on side 120 and side 122 of portal 104 that robotic vehicle 106 enters when robotic vehicle 106 seeks to travel through portal 104. Selected distance 110 is on both side 120 and side 122 of portal 104 in this illustrative embodiment. However, in other illustrative embodiments, selected distance 110 may only be on a particular side of portal 104. In this illustrative embodiment, selected distance 110 substantially forms a circle around portal 104. Selected distance 110 may be configured by the user or determined based on the size of robotic vehicle 106 and attributes of portal 104. Attributes of portal 104 include dimensions of portal 104 and speed of portal 104 when moving between an opened and closed position.

Portal access system 114 controls the operation of portal 104 and lock 116. Portal access system 114 may comprise a movement system and a data processing system that runs a portal management process. The portal management process receives data from detection system 124. The portal management process uses the data received from detection system 124 to determine whether robotic vehicle 106 is present within selected distance 110. For example, the portal management process may determine that robotic vehicle 106 is present within selected distance 110 if image information received from a camera system in detection system 124 matches image information stored for robotic vehicle 106 in the data processing system.

In another illustrative embodiment, the portal management process may use the image information to determine whether an authorized human is within selected distance 110. If an authorized human is within selected distance 110, the portal management process may proceed as if robotic vehicle 106 is within selected distance 110.

Alternatively, portal management process may determine robotic vehicle 106 is within selected distance 110 using a wireless communications unit and/or a radio frequency identifier tag reader associated with portal access system 114. The wireless communications unit may be used to receive a request transmitted wirelessly by robotic vehicle. Receiving the request may cause the portal management process to determine that robotic vehicle 106 is within selected distance 110 of portal 104.

When the portal management process detects that robotic vehicle 106 is within selected distance 110, the portal management process issues a signal to movement system to open portal 104. The movement system disengages lock 116 if lock 116 is engaged. The movement system then moves portal 104 into the opened position from the closed position. The movement system may comprise a drive motor, an actuator, and/or gears. The movement system may also be used to move portal 104 into the closed position from the opened position.

Once portal 104 is opened, robotic vehicle 106 may travel through portal 104 to area 132. The portal management process in portal access system 114 continues to detect whether robotic vehicle 106 is within specified distance 110. Once robotic vehicle 106 enters area 132, the portal management process detects that robotic vehicle 106 is no longer within specified distance 110. The portal management process may use information received from detection system 124, information received using the wireless communication unit, or information received using the radio frequency identifier tag to determine that robotic vehicle 106 is no longer within specified distance 110.

When robotic vehicle 106 is no longer detected within specified distance 110, the portal management process issues a signal to movement system to close portal 104. The movement system then moves portal 104 into the closed position. In some illustrative embodiments, the movement system also activates lock 116 after closing portal 104.

In some illustrative embodiments, portal 104 may also be moved between the opened position and the closed position by a human. In such an embodiment, the human may disengage lock 116 using a combination or a key. Alternatively, in embodiments in which lock 116 is replaced with a latch, the human may disengage the latch by twisting a handle, pulling a cord, moving a bar, or another suitable action.

In some illustrative embodiments, the portal management process in portal access system 114 also uses information from detection system 124, a wireless communication unit, and/or a radio frequency identifier tag reader to determine whether robotic vehicle 106 is within safe distance 112 from portal 104. Safe distance 112 is a minimum distance between robotic vehicle 106 and portal 104 that robotic vehicle 106 must be located before portal access system 114 will cause portal 104 to open. In this illustrative example, safe distance 112 is a distance from portal 104 in which robotic vehicle 106 would be contacted by portal 104 if robotic vehicle 106 is within safe distance 112 while portal 104 is moving. That is, if robotic vehicle 106 is present within safe distance 112 while portal 104 is moving from a closed position to an open position or an open position to a closed position, portal 104 may contact and/or damage robotic vehicle 106. Safe distance 112 may be located on the side of portal 104 through which portal 104 swings when opening or closing. In this illustrative embodiment, safe distance 112 is located on side 120 of portal 104.

When robotic vehicle is detected within safe distance 112, the portal management process does not send the signal to the movement system to move portal 104. If the movement system is already in the process of moving portal 104, the portal management process may send a signal to the movement system to cancel the current movement. The portal management process may wait until robotic vehicle 106 is no longer detected within safe distance 112 before resuming normal operation. Alternatively, the portal management process may send a message to robotic vehicle 106 using the wireless communication unit. The message may contain a representation of safe distance 112 so robotic vehicle 106 may reposition outside safe distance 112.

The illustration of portal management environment 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, detection system 124 may be a part of portal access system 114 in some illustrative embodiments. Although portal 104 swings through side 120 on axis 128 in this illustrative example, portal 104 may swing through side 120 and side 122 in other illustrative examples. In such illustrative examples, safe distance 112 may be present on side 120 and side 122 of portal 104. In another example, portal 104 and fence 118 may be located at least partially in a building, a driveway, a path, or a road.

The different illustrative embodiments recognize and take into account that it is desirable for a robotic vehicle to be able to perform tasks without human intervention. A robotic vehicle traveling through an area while performing tasks may travel between areas that have access restrictions in the form of a portal. For example, a portal may be a gate in a fence.

The different illustrative embodiments recognize and take into account that the portal management system detects the presence of the robotic vehicle within a selected distance of the portal. For example, the detection of the robotic vehicle may be a request received from the robotic vehicle over a wireless connection, a radio frequency identification tag read by the portal management system, image information received from a camera system, infrared information received from an infrared sensor, or another suitable detection method.

The different illustrative embodiments also recognize that, once the robotic vehicle is detected by the portal management system, the portal management system may cause the portal to open. The robotic vehicle may then travel through the portal and between areas in which travel is restricted. Once the robotic vehicle has passed through the portal, the portal management system may cause the gate to close.

The different illustrative embodiments also recognize and take into account that if the robotic vehicle is closer to the portal than a safe distance and the portal is a swinging gate, the robotic vehicle may be contacted and/or damaged during the opening of the portal. The different illustrative embodiments recognize that the portal management system may determine whether the location of the robotic vehicle is closer to the portal than a safe distance prior to opening the gate.

Thus, the different illustrative embodiments provide an apparatus, a system, and a method for managing a portal. The different illustrative embodiments provide an apparatus comprising a locking system, a detection system, and a portal access system. The locking system is for a portal having a first side and a second side. The portal is configured to swing about an axis through the first side between an opened position and a closed position. The detection system is configured to detect when a robotic vehicle is located within a selected distance of the portal. The portal access system unlocks the portal when the portal is in the closed position and the robotic vehicle is detected within a selected distance of the portal using the detection system.

Figure 2:
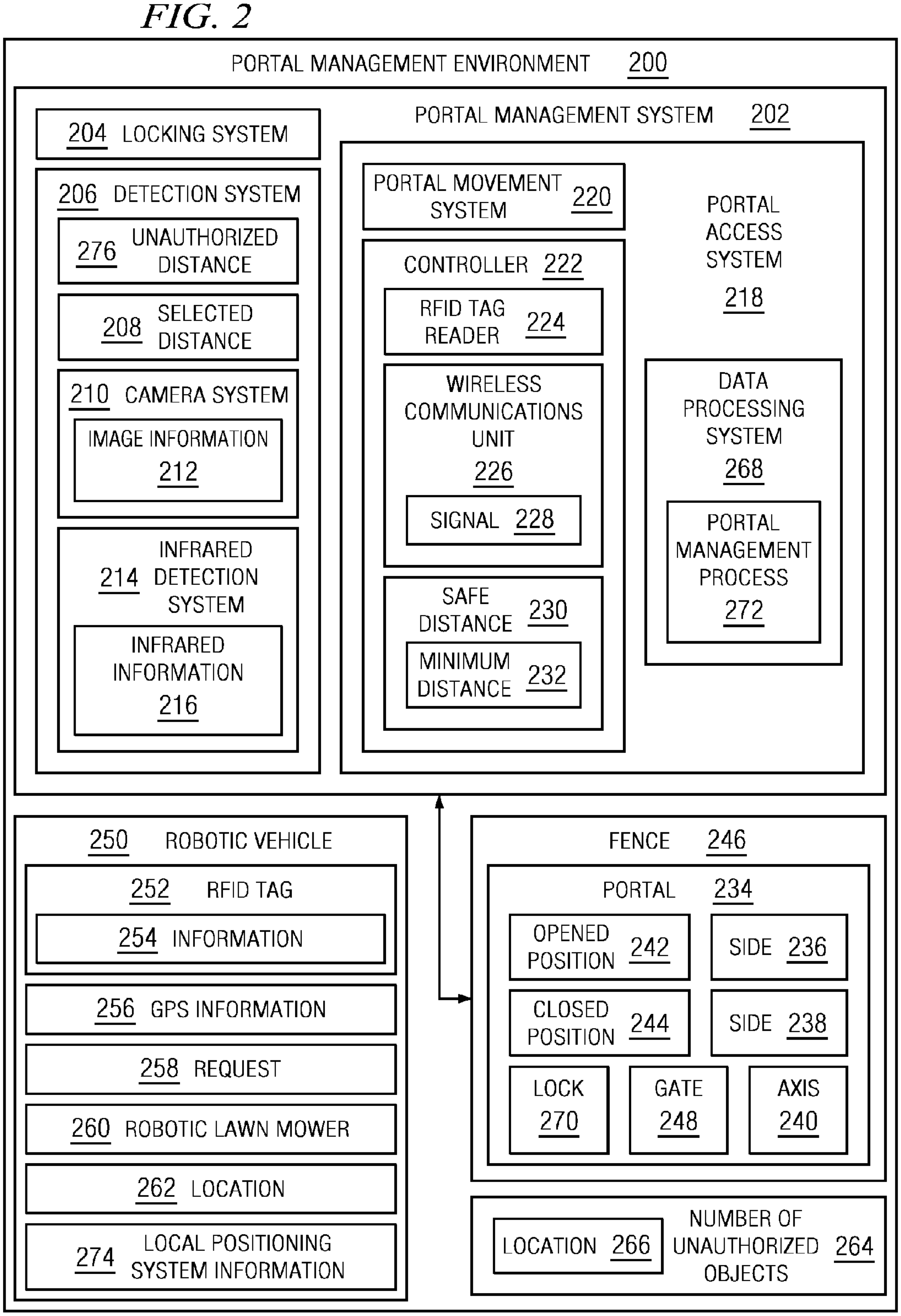
FIG. 2 is a block diagram of a portal management environment in accordance with an illustrative embodiment.

Turning now to FIG. 2, a block diagram of a portal management environment is depicted in accordance with an illustrative embodiment. Portal management environment 100 is an example implementation of portal management environment 200. Portal management environment 100 in FIG. 1 is an example of one physical implementation for portal management environment 200. Portal access system 114 is an example implementation of portal access system 218. Gate 104 is an example implementation of portal 234.

Portal management environment 200 is any type of area in which a portal management system may operate. In an illustrative example, portal management environment 200 may be a gate, door, or other access control device located in a structure, building, worksite, area, yard, golf course, indoor environment, outdoor environment, and/or any other suitable portal management environment or combination of portal management environments.

Robotic vehicle 250 is a vehicle capable of performing physical tasks in a fully unattended mode or a partially unattended mode. A fully unattended mode is mode in which robotic vehicle 250 performs physical tasks with no human intervention. For example, robotic vehicle 250 may engage, travel, mow lawn, travel to the original location of robotic vehicle 250 or another location, and disengage without human intervention. A partially unattended mode is a mode in which robotic vehicle 250 performs some tasks autonomously, but may be controlled by a user. For example, robotic vehicle 250 may be engaged by a user actuating a button and directed or moved to a particular location by the user. Robotic vehicle 250 may then perform the physical task until the user disengages robotic vehicle 250. In this illustrative embodiment, robotic vehicle 250 is robotic lawn mower 260.

Portal 234 is present within portal management environment 200. Portal 234 is a barrier that controls physical access between the area on side 236 of portal 234 and the area on side 238 of portal 234. Portal 234 is movable between opened position 242 and closed position 244.

When portal 234 is in closed position 244, physical access through portal 234 is blocked. Portal 234 may be moved to opened position 242 by moving portal 234 about axis 240. Axis 240 may be perpendicular to the surface of the area.

When portal 234 is in opened position 242, physical access through portal 234 is allowed. That is, portal 234 is a movable barrier to block or allow physical access through portal 234 to a particular area. In this illustrative embodiment, portal 234 is gate 248.

Portal 234 may also comprise lock 270. Lock 270 is a fastening device that substantially prevents portal 234 from moving when lock 270 is engaged. When lock 270 is disengaged, portal 234 is not substantially prevented from moving.

Portal 234 may be a part of fence 246. Fence 246 also controls physical access between the area on side 236 of fence 246 and the area on side 238 of fence 246. However, fence 246 is fixed and is not movable to allow physical access through fence 246. In illustrative embodiments that include lock 270, lock 270 may fasten portal 234 to fence 246 when lock 270 is engaged.

Portal 234 is managed by portal management system 202. Portal management system 202 controls the operation of portal 234, controls the operation of lock 270, and generates information used to detect the presence and location 262 of robotic vehicle 250. Portal management system 202 comprises portal access system 218, detection system 206, and locking system 204.

Portal access system 218 is a number of components that control the operation of portal 234. Portal access system 218 comprises portal movement system 220, controller 222, and data processing system 268. Data processing system 268 loads instructions from storage into a memory and executes the instructions on a processor unit. In this illustrative example, data processing system 268 runs portal management process 272.

Portal management process 272 receives data from detection system 206 and controller 222. Detection system 206 is a number of instruments that transmit data to portal management process 272 for detecting the presence of robotic vehicle 250. Detection system 206 may be attached to portal 234, located within portal management system 202, or in another suitable location.

In these illustrative examples, detection system 206 comprises camera system 210 and infrared detection system 214. Camera system 210 generates image information 212. Image information 212 is the image data obtained by camera system 210 for a particular area. Image information 212 may be photos, video, or both photos and video. Infrared detection system 214 generates infrared information 216. Infrared information 216 is infrared data obtained by infrared detection system 214 in a particular area. Infrared information 216 may be heat signatures or data representing movement in the particular area. Infrared detection system 214 may also comprise a Light Detection and Ranging (LIDAR) detector. In such an illustrative embodiment, infrared information 216 may be time-of-flight range data from the Light Detection and Ranging detector.

Detection system 206 may be directed at the area from portal 234 to selected distance 208 such that information generated by detection system 206 is relevant to the area from portal 234 to selected distance 208. For example, in illustrative embodiments in which detection system 206 comprises camera system 210, camera system 210 is pointed such that image information 212 generated by camera system 210 is image information 212 of the area from portal 234 to selected distance 208.

In some illustrative embodiments, detection system 206 is also directed at the area from portal 234 to unauthorized distance 276. For example, in illustrative embodiments in which detection system 206 comprises camera system 210, camera system 210 is pointed such that image information 212 generated by camera system 210 is image information 212 of the area from portal 234 to unauthorized distance 276 and selected distance 208.

Portal management process 272 receives information from detection system 206, such as image information 212 and infrared information 216. Portal management process 272 then detects whether robotic vehicle 250 is present within selected distance 208 using the information. That is, portal management process 272 determines whether robotic vehicle 250 is present within image information 212 and/or infrared information 216.

In other illustrative embodiments, portal management process 272 determines whether an authorized human is present within image information 212. The authorized human may be identified by comparing image information 212 to stored images of the authorized human. When an authorized human is present within image information 212, portal management process may proceed as if robotic vehicle 250 is located within selected distance 208.

In some illustrative embodiments, portal management process 272 also identifies location 262 of robotic vehicle 250 relative to portal 234. That is, portal management process 272 identifies a distance and a direction from portal 234 to robotic vehicle 250. Portal management process 272 may use image information 212 or infrared information 216 to determine location 262 of robotic vehicle 250.

Controller 222 is a component of portal access system 218 that controls portal movement system 220 and locking system 204. Portal movement system 220 comprises a number of mechanical and electrical components that move portal 234 between opened position 242 and closed position 244. For example, portal movement system 220 may comprise a drive motor. Controller 222 switches voltage and sends and receives signals to cause portal movement system 220 to move portal 234 between opened position 242 and closed position 244. If portal management process 272 determines that robotic vehicle is located within selected distance 208, portal management process 272 sends a signal to controller 222.

Controller 222 receives a message from portal management process 272 indicating that portal 234 is to be moved to the opened position 242. Controller 222 applies voltage to and sends and receives messages with portal movement system 220 and locking system 204. Thus, portal 234 moves to the opened position 242.

Portal management process 272 continues to detect robotic vehicle 250 as within selected distance 208 until robotic vehicle 250 travels out of the area between portal 234 and selected distance 208. Once robotic vehicle 250 is outside selected distance 208, portal management process 272 no longer detects robotic vehicle 250 within selected distance 208. Portal management process 272 then sends a message to controller 222 that portal 234 is to be moved to closed position 244.

Controller 222 also controls locking system 204. Locking system 204 engages and disengages lock 270 on portal 234. Locking system 204 receives signals and/or voltage from controller 222 such that lock 270 is engaged or disengaged. In one illustrative embodiment, locking system 204 comprises an actuator that engages or disengages lock 270.

Controller 222 also relays input data from radio frequency identification tag reader 224 and wireless communications unit 226 to portal management process 272. In one illustrative embodiment, robotic vehicle 250 sends request 258 to controller 222. Controller 222 receives request 258 using wireless communications unit 226 and relays request 258 to portal management process 272. Portal management process 272 may accept the request by sending a message to controller 222 indicating portal 234 is to be opened. In some illustrative embodiments, request 258 contains an identifier or authorization code. In such illustrative embodiments, if request 258 has an incorrect identifier or authorization code, portal management process 272 may ignore request 258.

Radio frequency identification tag reader 224 detects the presence of radio frequency identification tag 252. In this illustrative embodiment, radio frequency identification tag 252 is located in robotic vehicle 250. Radio frequency identification tag reader 224 also reads information 254 stored in radio frequency identification tag 252. Information 254 may be identification information and is relayed to portal management process 272. In some illustrative embodiments, radio frequency identification tag reader 224 may also transmit the distance from radio frequency identification tag 252 to radio frequency identification tag reader 224 to portal management process 272 through controller 222. The distance may be determined by the signal strength of information 254 when information 254 was received by radio frequency identification tag reader 224.

Portal management process 272 may use information 254 received by radio frequency identification tag reader 224 to determine that robotic vehicle 250 is within selected distance 208 and send a number of messages to controller 222 indicating portal 234 is to be opened.

In some illustrative embodiments, robotic vehicle 250 identifies location 262 of robotic vehicle 250 by transmitting global positioning system information 256 to controller 222. Global positioning system information 256 is a number of coordinates used to identify location 262 globally.

Controller 222 receives global positioning system information 256 using wireless communications unit 226. Controller 222 relays global positioning system information 256 to portal management process 272. Portal management process 272 may retrieve a number of global positioning system coordinates that identify the area from portal 234 to selected distance 208 from storage in data processing system 268.

Portal management process 272 compares global positioning system information 256 to the number of coordinates retrieved from storage. If global positioning system information 256 is located within the area defined by number of coordinates, portal management process 272 detects robotic vehicle 250 within selected distance 208.

In other illustrative embodiments, robotic vehicle 250 identifies location 262 of robotic vehicle by transmitting local positioning system information 274. Local positioning system information 274 is a number of coordinates used to identify location 262 within a particular area.

For example, local positioning system information 274 may comprise image information of the area surrounding robotic vehicle 250. Robotic vehicle 250 may identify a number of items in the image information to determine local positioning information 274. For example, robotic vehicle 250 may generate image information for an area surrounding robotic vehicle 250. Robotic vehicle 250 may then locate image information associated with items identified in the image information for the surrounding area. Robotic vehicle 250 may then determine local positioning system information 274 based on location 262 relative to the items identified in the image information.

Controller 222 receives local positioning system information 274 using wireless communications unit 226. Controller 222 relays local positioning system information 274 to portal management process 272. Portal management process 272 may retrieve a number of local positioning system coordinates that identify the area from portal 234 to selected distance 208 from storage in data processing system 268.

Portal management process 272 compares local positioning system information 274 to the number of coordinates retrieved from storage. If local positioning system information 274 is located within the area defined by number of coordinates, portal management process 272 detects robotic vehicle 250 within selected distance 208.

In some illustrative embodiments, portal management process 272 does not send a message to controller 222 to move portal 234 from closed position 244 to opened position 242 when a condition is in effect. Portal management process 272 may not send a message to controller 222 when the condition is in effect, even if robotic vehicle 250 is detected within selected distance 208.

One condition that may cause portal management process 272 not to send a message to open portal 234 is that portal management process 272 detects location 262 of robotic vehicle 250 as within safe distance 230. "Within safe distance 230" means within the area between portal 234 and safe distance 230.

Safe distance 230 is minimum distance 232 from portal 234 in which robotic vehicle 250 would be contacted by portal 234 if robotic vehicle 250 is within safe distance 230 while portal 234 is moving. Minimum distance 232 may be a radius of a circle or semicircle. That is, if robotic vehicle 250 is present within safe distance 230 while portal 234 is moving from closed position 244 to open position 242 or opened position 242 to closed position 244, portal 234 may contact and/or damage robotic vehicle 250. In some illustrative embodiments, safe distance 230 is configured by a user and may not be minimum distance 232.

When robotic vehicle 250 is detected within safe distance 230, portal management process 272 may not send a message to controller 222 indicating portal 234 is to be opened. Portal management process 272 may not send the message until robotic vehicle 250 is no longer detected within safe distance 230.

In some illustrative embodiments, portal management process 272 causes controller 222 to send signal 228 to robotic vehicle 250 using wireless communications unit 226. Signal 228 is an identification of safe distance 230. For example, signal 228 may be a numerical representation of safe distance 230 from portal 234. Signal 228 may also be a representation of the distance and direction robotic vehicle 250 is to travel so location 262 is outside safe distance 230.

In another illustrative example, portal management system 272 may not send a message to controller 222 indicating that portal 234 is to be opened if location 266 of number of unauthorized objects 264 is detected within unauthorized distance 276. In some illustrative embodiments, unauthorized distance 276 is the same distance as selected distance 208. Of course, in other illustrative embodiments, unauthorized distance 276 is different than selected distance 208. Number of unauthorized objects 264 may be any mobile object other than robotic vehicle 250. In another illustrative example, number of unauthorized objects 264 comprises a number of particular humans or a particular type of animal. For example, number of unauthorized objects 264 may include one human and all cattle. Portal management process 272 detects location 266 of number of unauthorized objects 264 using image information 212, infrared information 216, and/or information 254.

In illustrative embodiments in which portal management process 272 detects number of unauthorized objects 264 using infrared information 216, portal management process 272 may compare infrared information 216 with stored infrared information. The stored infrared information may be, for example, a database of heat signatures of unauthorized humans or animals to travel through portal 234.

In illustrative embodiments in which portal management process 272 detects number of unauthorized objects 264 using information 254, portal management process 272 may compare information 254 with stored radio frequency identification tag information. The stored radio frequency identification tag information may be, for example, a database of unauthorized radio frequency identification tags to travel through portal 234.

For example, livestock in a pen that is maintained by robotic vehicle 250 may be marked with radio frequency identification tags stored as unauthorized in data processing system 268. Thus, portal 234 will not open if robotic vehicle 250 is traveling through portal 234 and livestock are within unauthorized distance 276. Unauthorized distance 276 may be substantially the same as selected distance 208 or another suitable distance.

In illustrative embodiments in which portal management process 272 detects number of unauthorized objects 264 using image information 212, portal management process 272 may compare image information 212 with stored image information. The stored image information may be, for example, a database of unauthorized humans or animals to travel through portal 234.

The illustration of portal management environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, number of unauthorized objects 264 may comprise all mobile objects without an authorized radio frequency identification tag. In such an example, portal management process 272 may not send a signal to controller 222 indicating portal 234 is to be opened if a human or animal is within selected distance 208 in addition to robotic vehicle 250.

For example, detection system 206 may comprise additional sensors. For example, detection system 206 may comprise an audio detection system. In such an illustrative example, robotic vehicle 250 may be detected within selected distance 208 if the audio properties of robotic vehicle are detected using the audio detection system.

In yet another illustrative example, portal movement system 220 may be absent from portal management system 220. In such an illustrative example, controller 220 controls locking system 204 to engage and disengage lock 270, but portal 234 is not moved by portal management system 202.

In such an illustrative example, a member associated with robotic vehicle 250 is used to move portal 234. The member may be a movable arm associated with robotic vehicle 250. Once locking system 204 disengages lock 270, robotic vehicle 250 may use the movable arm to engage portal 234. The movable arm may move portal 234 from closed position 244 to opened position 242. Robotic vehicle 250 may travel through portal 234. Once robotic vehicle 250 has traveled through portal 234, the movable arm may be used to move portal 234 from opened position 242 to closed position 244. Locking system 204 may then be used to engage lock 270.

Figure 3:
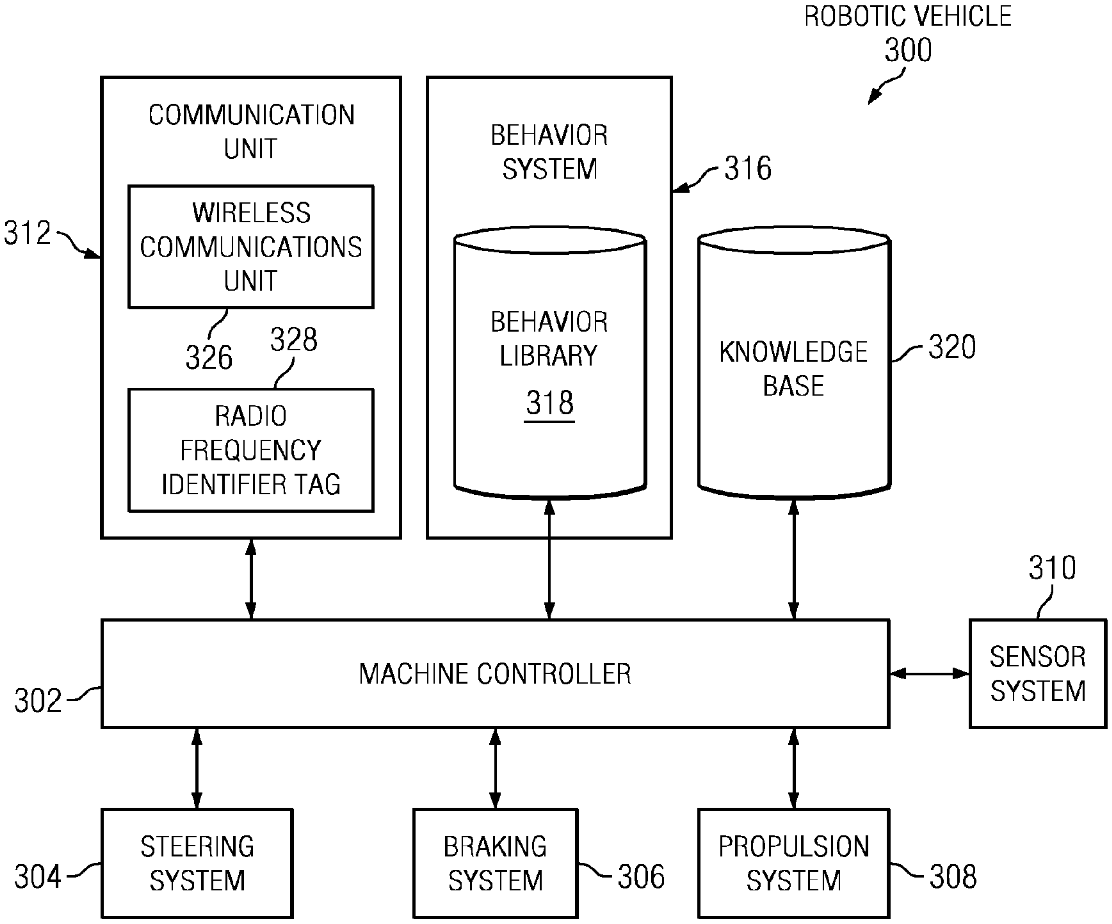
FIG. 3 is a block diagram of components used to control a robotic vehicle in accordance with an illustrative embodiment.

With reference now to FIG. 3, a block diagram of components used to control a robotic vehicle is depicted in accordance with an illustrative embodiment. In this example, robotic vehicle 300 is an example of a robotic vehicle, such as robotic vehicle 250 in FIG. 2. In this example, robotic vehicle 300 includes machine controller 302, steering system 304, braking system 306, propulsion system 308, sensor system 310, communication unit 312, behavior system 316, behavior library 318, and knowledge base 320.

Figure 4:
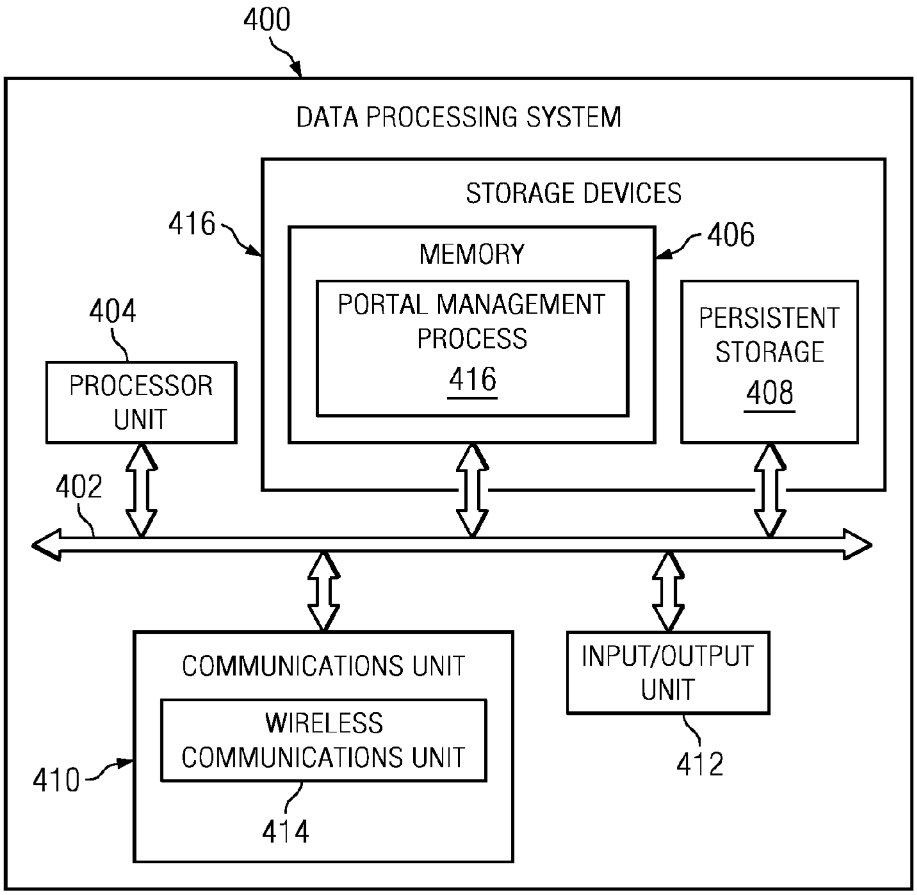
FIG. 4 is a block diagram of a data processing system in accordance with an illustrative embodiment.

Machine controller 302 may be, for example, a data processing system, such as data processing system 400 in FIG. 4, or some other device that may execute processes to control movement of a robotic vehicle. Machine controller 302 may be, for example, a computer, an application integrated specific circuit, and/or some other suitable device. Different types of devices and systems may be used to provide redundancy and fault tolerance. Machine controller 302 may execute processes to control steering system 304, braking system 306, and propulsion system 308 to control movement of the robotic vehicle 300. Machine controller 302 may send various commands to these components to operate the robotic vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions.

Steering system 304 may control the direction or steering of the robotic vehicle in response to commands received from machine controller 302. Steering system 304 may be, for example, an electrically controlled hydraulic steering system, an electrically driven rack and pinion steering system, an Ackerman steering system, a skid-steer steering system, a differential steering system, or some other suitable steering system.

Braking system 306 may slow down and/or stop the robotic vehicle in response to commands from machine controller 302. Braking system 306 may be an electrically controlled braking system. Braking system 306 may be, for example, a hydraulic braking system, a friction braking system, or some other suitable braking system that may be electrically controlled.

In these examples, propulsion system 308 may propel or move the robotic vehicle in response to commands from machine controller 302. Propulsion system 308 may maintain or increase the speed at which a robotic vehicle moves in response to instructions received from machine controller 302. Propulsion system 308 may be an electrically controlled propulsion system. Propulsion system 308 may be, for example, an internal combustion engine, an internal combustion engine/electric hybrid system, an electric engine, or some other suitable propulsion system.

Sensor system 310 is a high integrity perception system and may be a set of sensors used to collect information about the environment around a robotic vehicle. In these examples, the information is sent to machine controller 302 to provide data in identifying how the robotic vehicle should move in different modes of operation. In these examples, a set refers to one or more items. A set of sensors is one or more sensors in these examples.

Communication unit 312 is a high integrity communications system and may provide multiple redundant communications links and channels to machine controller 302 to receive information. The communication links and channels may be heterogeneous and/or homogeneous redundant components that provide fail-safe communication. This information includes, for example, data, commands, and/or instructions. Communication unit 312 may take various forms. For example, communication unit 312 may include wireless communications unit 326. Wireless communications unit 326 is a wireless transmitter and receiver that is capable of transmitting and receiving data using a wireless system. Examples of a wireless system are a cellular phone system, a Wi-Fi wireless system, a Bluetooth wireless system, and/or some other suitable wireless communications system. Communication unit 312 also may include a communications port, such as, for example, a universal serial bus port, a serial interface, a parallel port interface, a network interface, and/or some other suitable port to provide a physical communications link.

Further, communication unit 312 may also include radio frequency identifier tag 328. Radio frequency identifier tag 328 is a device that transmits an identifier for radio frequency identifier tag 328. The transmission may be active or passive. That is, the transmission may take place at all times, or the transmission may only occur when radio frequency identifier tag 328 is within a particular range of a radio frequency identifier tag reader, such as radio frequency identifier tag reader 224 in FIG. 2. The identifier may be used by a portal management system to identify and/or robotic vehicle 300 for opening or closing a portal.

Communication unit 312 may be used to transmit a request to a portal access system, such as request 258 in FIG. 2. Communication unit 312 may also be used to receive a response from a portal access system. The response may indicate a particular distance from a portal for robotic vehicle to maintain. The distance may be a safe distance, such as safe distance 230 in FIG. 2.

Behavior system 316 contains behavior library 318, which in turn contains various behavioral processes specific to machine coordination that can be called and executed by machine controller 302. In one illustrative embodiment, behavior library 318 includes a behavior for discontinuing motion and propulsion when a portal is opening or closing. Behavior system 316 may be implemented in a remote location, such as another data processing system located outside of robotic vehicle 300, or in one or more robotic vehicles. Behavior system 316 may be distributed throughout multiple robotic vehicles, or reside locally on one control robotic vehicle, such as high integrity robotic vehicle architecture 300 in FIG. 3. In an illustrative embodiment, where behavior system 316 resides on one control robotic vehicle, the control robotic vehicle may distribute behavior libraries as needed to one or more other robotic vehicles. In another illustrative embodiment, some components of behavior system 316 may be located in a control robotic vehicle or in one or more robotic vehicles, while other components of behavior system 316 may be located in a number of data processing systems outside of robotic vehicles. For example, behavior library 318 may be located on a robotic vehicle while other aspects of behavior system 316 are located on a data processing system in a remote office. In one illustrative embodiment, there may be multiple copies of behavior library 318 within behavior system 316 on robotic vehicle 300 in order to provide redundancy.

Knowledge base 320 contains information about the operating environment, such as, for example, a fixed map showing streets, structures, tree locations, and other static object locations. Knowledge base 320 may also contain information, such as, without limitation, local flora and fauna of the operating environment, current weather for the operating environment, weather history for the operating environment, specific environmental features of the work area that affect the robotic vehicle, and the like. The information in knowledge base 320 may be used to perform classification and plan actions. Knowledge base 320 may be located entirely in robotic vehicle 300 or parts or all of knowledge base 320 may be located in a remote location that is accessed by machine controller 302.

Turning now to FIG. 4, a block diagram of a data processing system is depicted in accordance with an illustrative embodiment. Data processing system 400 is an example of a data processing system 268 in FIG. 2.

In this illustrative example, data processing system 400 includes communications fabric 402, which provides communications between processor unit 404, memory 406, persistent storage 408, communications unit 410, and input/output (I/O) unit 412.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

In this illustrative embodiment, communications unit 410 comprises wireless communication unit 414. Wireless communication unit 414 is an example implementation of wireless communication unit 226 in FIG. 2. Wireless communications unit 414 may transmit messages to and receive messages from a robotic vehicle. The messages may be retrieved by portal management process 416 being run on processor unit 404.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. In some illustrative embodiments, input/output unit 412 is connected to a controller, such as controller 222. Portal management process 416 running on processor unit 404 may cause input/output unit 412 to relay messages to controller 222.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
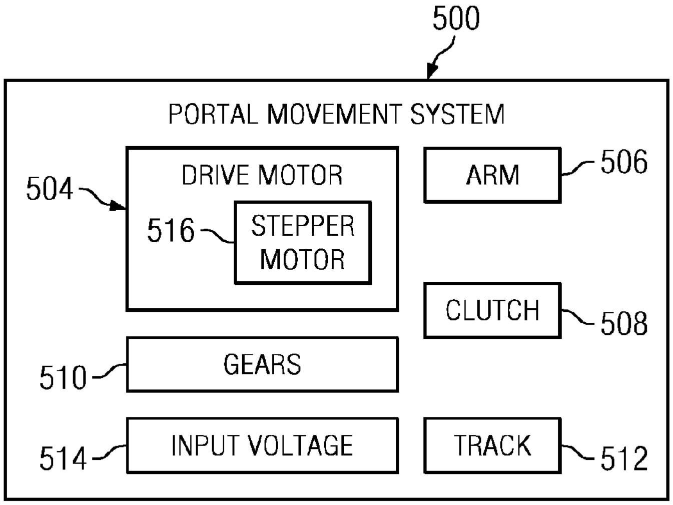
FIG. 5 is a block diagram of a portal movement system in accordance with an illustrative embodiment.

Turning now to FIG. 5, a block diagram of a portal movement system is depicted in accordance with an illustrative embodiment. Portal movement system 500 is an example implementation of portal movement system 220 in FIG. 2.

Portal movement system 500 mechanically moves an associated portal between an opened position and a closed position. Drive motor 504 converts electrical energy to mechanical energy. One example of drive motor 504 is stepper motor 516. Stepper motor 516 is a motor which in which a number of electromagnets are positioned around the edges of a central gear. The electromagnets are engaged in a particular pattern which causes the gear to turn.

In this illustrative example, input voltage 514 is applied to drive motor 504. Drive motor 504 produces mechanical energy that turns gears 510 using clutch 508. Clutch 508 allows drive motor 504 to slip in the event portal movement system 500 is obstructed. For example, if the portal made contact with an object that could not be moved by the drive motor 504, clutch 508 allows the output of drive motor 504 to slip without causing damage to gears 510.

Gears 508 are configured to increase the torque output of drive motor 504 on arm 506. Arm 506 is an extending element associated with the portal and gears 510. Arm 506 uses the rotational force from gears 510 to extend or retract. Arm 506 extending causes the portal to close. Arm 508 retracting causes the portal to open. In some illustrative embodiments, the portal is on track 512. The portal may have a wheel that is guided by track 512 during movement of the portal.

Figure 6:
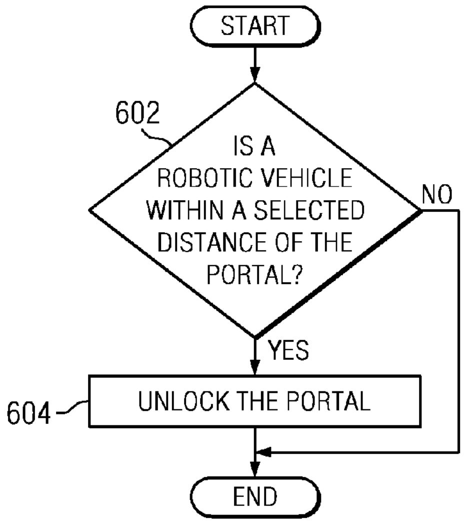
FIG. 6 is a flowchart of a process for managing a portal in accordance with an illustrative embodiment.

Turning now to FIG. 6, a flowchart of a process for managing a portal is depicted in accordance with an illustrative embodiment. The process may be implemented in portal management environment 200 using portal management system 202 in FIG. 2. The process may be performed by portal management process 272.

The process begins by determining whether a robotic vehicle is within a selected distance of the portal (operation 602). The selected distance may be configured by the user or determined based on the size of the robotic vehicle. The process may make the determination using image information from a camera system, radio frequency identification tag information, global positioning system information, infrared information, image information, or other suitable information.

If the process determines that the robotic vehicle is not within the selected distance of the portal, the process terminates. If the process determines that the robotic vehicle is within the selected distance of the portal at operation 602, the process unlocks the portal (operation 604). The process may unlock the portal by disengaging a lock, such as lock 270. The process terminates thereafter.

Figure 7:
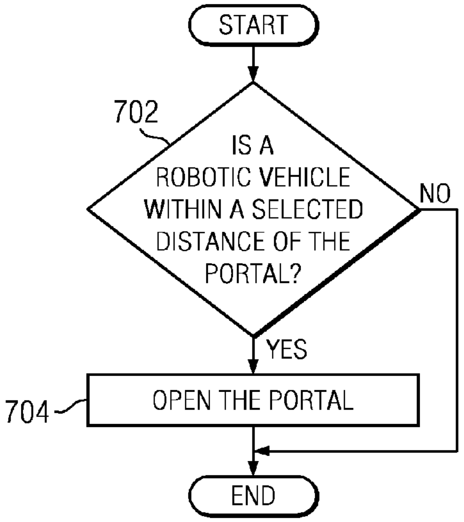
FIG. 7 is a flowchart of an additional process for managing a portal in accordance with an illustrative embodiment.

Turning now to FIG. 7, a flowchart of an additional process for managing a portal is depicted in accordance with an illustrative embodiment. The process may be implemented in portal management environment 200 using portal management system 202 in FIG. 2. The process may be performed by portal management process 272.

The process begins by determining whether a robotic vehicle is within a selected distance of the portal (operation 702). The selected distance may be configured by the user or determined based on the size of the robotic vehicle. The selected distance may also be determined based on the size of the portal and the maximum range of a detection system The process may make the determination using image information from a camera system, radio frequency identification tag information, global positioning system information, infrared information, image information, or other suitable information.

If the process determines that the robotic vehicle is not within the selected distance of the portal, the process terminates. If the process determines that the robotic vehicle is within the selected distance of the portal at operation 702, the process opens the portal (operation 704). The process may open the portal using a portal movement system, such as portal movement system 500 in FIG. 5. The process terminates thereafter.

Figure 8:
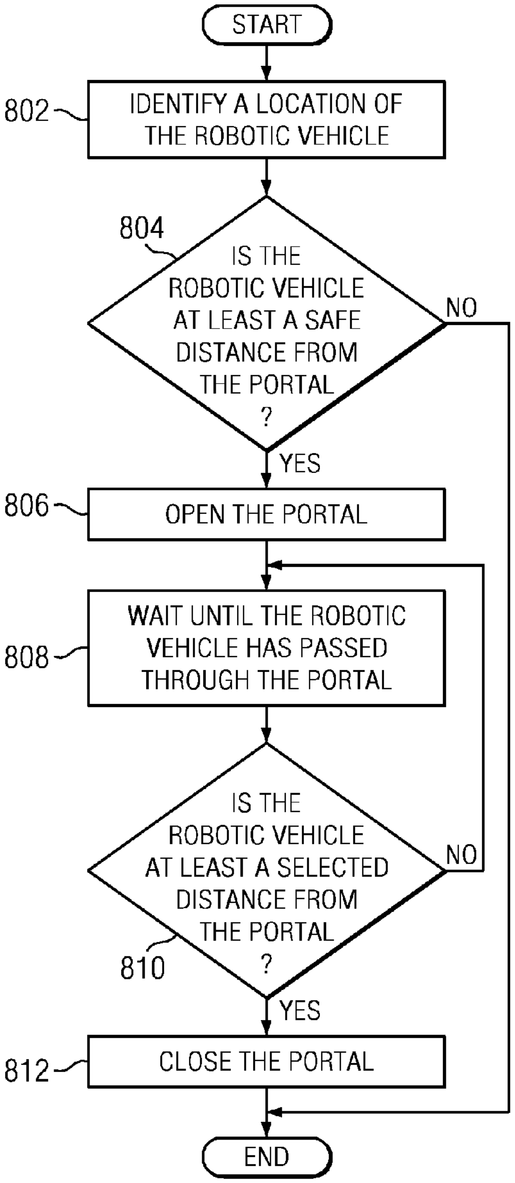
FIG. 8 is a flowchart of a process for opening and closing a portal in accordance with an illustrative embodiment.

Turning now to FIG. 8, a flowchart of a process for opening and closing a portal is depicted in accordance with an illustrative embodiment. The process may be implemented in portal management environment 200 using portal management system 202 in FIG. 2. The process may be performed by portal management process 272.

The process begins by identifying a location of the robotic vehicle (operation 802). The process may identify the location using image information from a camera system, radio frequency identification tag information, global positioning system information, infrared information, image information, or other suitable information. The process then determines whether the robotic vehicle is at least a safe distance from the portal (operation 804). The safe distance may be the minimum distance the robotic vehicle may be from the portal during a move of the portal without being contacted by the portal.

If the process determines that the vehicle is not at least a safe distance from the portal, the process terminates. If the process determines that the vehicle is at least a safe distance from the portal at operation 804, the process opens the portal (operation 806). The process then waits until the robotic vehicle has passed through the portal (operation 808). The process then determines whether the robotic vehicle is at least a selected distance from the portal (operation 810). If the process determines that the robotic vehicle is not at least a selected distance from the portal, the process returns to operation 808. The selected distance is an example implementation of selected distance 208.

If the process determines that the robotic vehicle is at least a selected distance from the portal at operation 810, the process closes the portal (operation 812). The process terminates thereafter.

Figure 9:
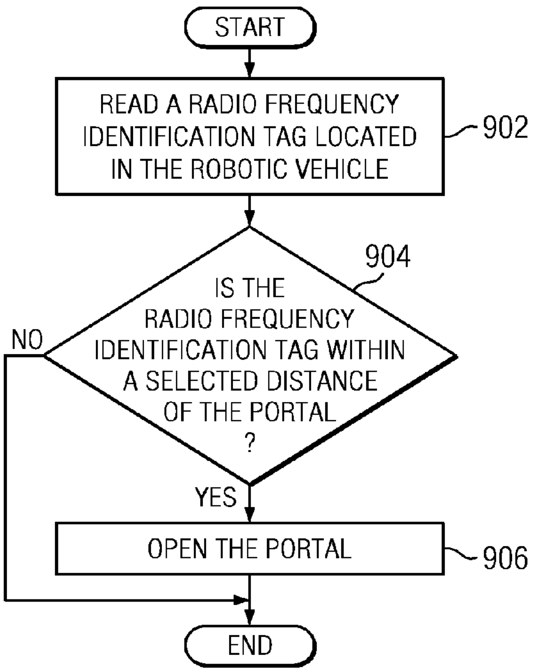
FIG. 9 is a flowchart of a process for determining whether a robotic vehicle is within a selected distance of a portal in accordance with an illustrative embodiment.

Turning now to FIG. 9, a flowchart of a process for determining whether a robotic vehicle is within a selected distance of a portal is depicted in accordance with an illustrative embodiment. The process may be implemented in portal management environment 200 using portal management system 202 in FIG. 2. The process may be performed by portal management process 272. The process is an example implementation of operation 602 in FIG. 6.

The process begins by reading a radio frequency identification tag located in the robotic vehicle (operation 902). The process may read the radio frequency identification tag by receiving information from the radio frequency identification tag. For example, the process may receive an identifier from the radio frequency identification tag.

The process then determines if the radio frequency identification tag is within a selected distance of the portal (operation 904). The determination may be based on the information received from the radio frequency identification tag or from the signal strength of the information.

If the process determines that the radio frequency identification tag is not within a selected distance of the portal, the process terminates. If the process determines that the radio frequency identification tag is within the selected distance, the process opens the portal (operation 906). The process terminates thereafter.

Figure 10:
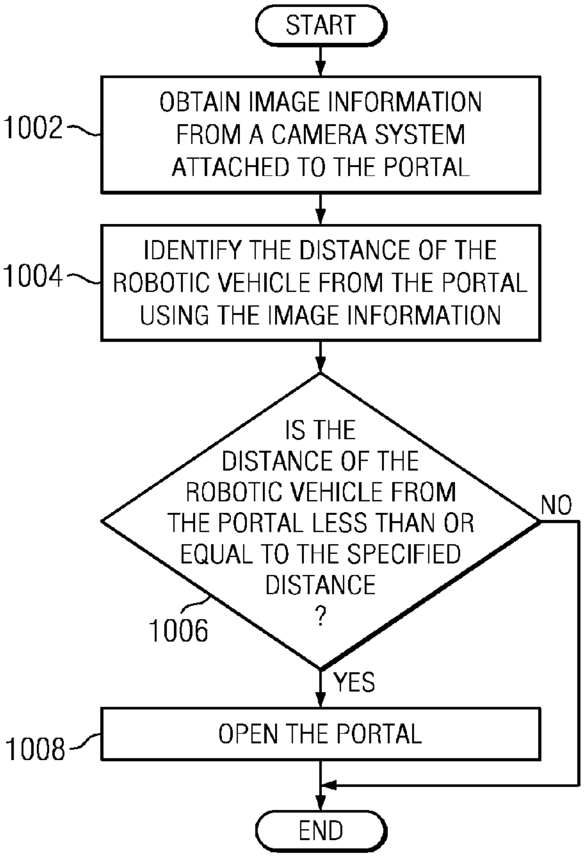
FIG. 10 is a flowchart of a second process for determining whether a robotic vehicle is within a selected distance of a portal in accordance with an illustrative embodiment.

Turning now to FIG. 10, a flowchart of a second process for determining whether a robotic vehicle is within a selected distance of a portal is depicted in accordance with an illustrative embodiment. The process may be implemented in portal management environment 200 using portal management system 202 in FIG. 2. The process may be performed by portal management process 272. The process is an example implementation of operation 602 in FIG. 6.

The process begins by obtaining image information from a camera system attached to the portal (operation 1002). The image information may comprise photo, video, or both. The process then identifies the distance of the robotic vehicle from the portal using the image information (operation 1004).

The process then determines whether the distance of the robotic vehicle from the portal is less than or equal to the specified distance (operation 1006). If the process determines that the distance of the robotic vehicle from the portal is not less than or equal to the specified distance, the process terminates. If the process determines that the distance of the robotic vehicle from the portal is less than or equal to the specified distance, the process opens the portal (operation 1008). In some illustrative embodiments, the portal does not open in operation 1008 when a condition is present, regardless of the location of the robotic vehicle. For example, the condition may be the presence of the robotic vehicle within a distance of the portal such that the portal would contact the robotic vehicle when opening or closing. The process terminates thereafter.

Figure 11:
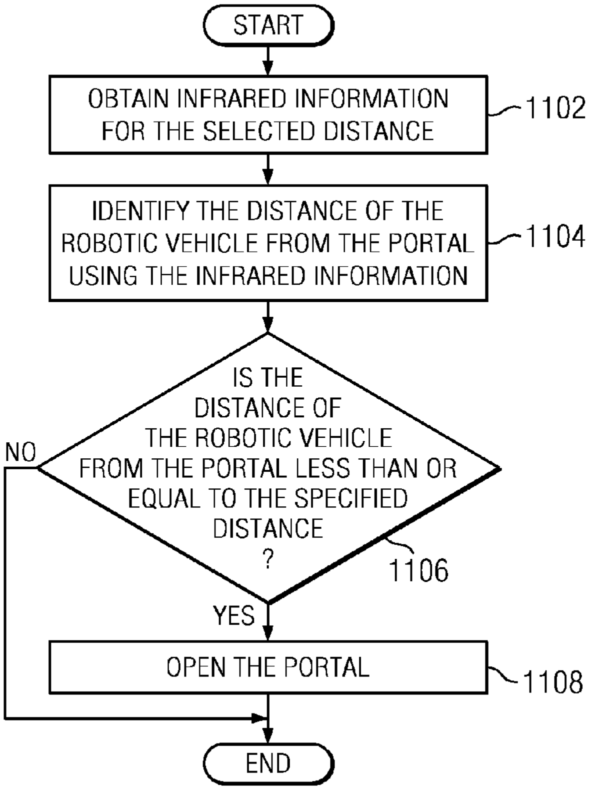
FIG. 11 is a flowchart of a third process for determining whether a robotic vehicle is within a selected distance of a portal in accordance with an illustrative embodiment.

Turning now to FIG. 11, a flowchart of a third process for determining whether a robotic vehicle is within a selected distance of a portal is depicted in accordance with an illustrative embodiment. The process may be implemented in portal management environment 200 using portal management system 202 in FIG. 2. The process may be performed by portal management process 272. The process is an example implementation of operation 602 in FIG. 6.

The process begins by obtaining infrared information from a camera system attached to the portal (operation 1002). The infrared information may comprise heat signatures, motion patterns, or both. The process then identifies the distance of the robotic vehicle from the portal using the infrared information (operation 1004).

The process then determines whether the distance of the robotic vehicle from the portal is less than or equal to the specified distance (operation 1106). If the process determines that the distance of the robotic vehicle from the portal is greater than the specified distance, the process terminates. If the process determines that the distance of the robotic vehicle from the portal is less than or equal to the specified distance, the process opens the portal (operation 1108). The process terminates thereafter. In some illustrative embodiments, the portal does not open in operation 1108 when a condition is present, regardless of the location of the robotic vehicle. For example, the condition may be the presence of the robotic vehicle within a distance of the portal such that the portal would contact the robotic vehicle when opening or closing.

Figure 12:
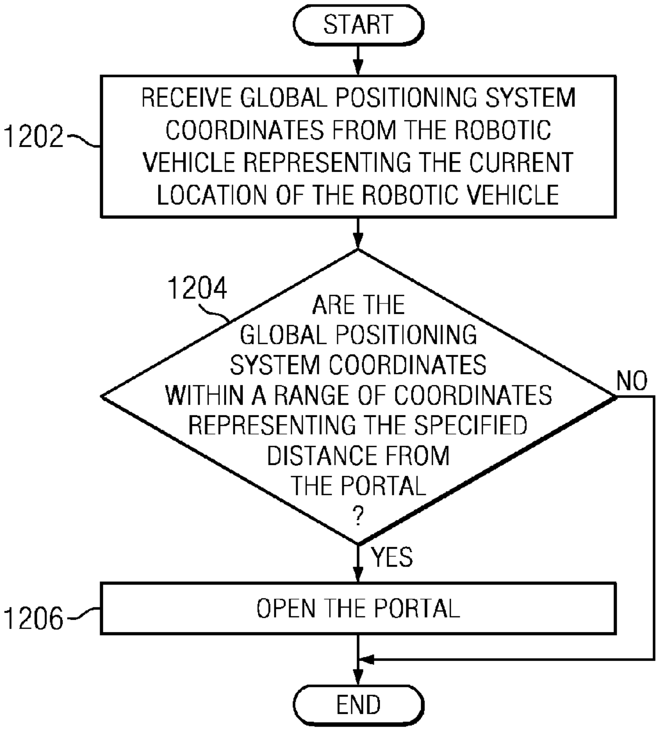
FIG. 12 is a flowchart of a fourth process for determining whether a robotic vehicle is within a selected distance of a portal in accordance with an illustrative embodiment.

Turning now to FIG. 12, a flowchart of a fourth process for determining whether a robotic vehicle is within a selected distance of a portal is depicted in accordance with an illustrative embodiment. The process may be implemented in portal management environment 200 using portal management system 202 in FIG. 2. The process may be performed by portal management process 272. The process is an example implementation of operation 602 in FIG. 6.

The process begins by receiving global positioning system coordinates from the robotic vehicle representing the current location of the robotic vehicle (operation 1202). The robotic vehicle may transmit the global positioning system coordinates upon entering a certain area, or the process may send a request to the robotic vehicle for the global positioning system coordinates.

The process then determines whether the global positioning system coordinates are within a range of coordinates representing the specified distance from the portal (operation 1204). The range of coordinates may be retrieved from a storage device by the process. If the process determines that the global positioning system coordinates are not within a range of coordinates representing the specified distance from the portal, the process terminates. If the process determines that the global positioning system coordinates are within a range of coordinates representing the specified distance from the portal, the process opens the portal (operation 1206). The process terminates thereafter. In some illustrative embodiments, the portal does not open in operation 1206 when a condition is present, regardless of the location of the robotic vehicle. For example, the condition may be the presence of the robotic vehicle within a distance of the portal that would cause the portal to contact the robotic vehicle when opening or closing.

Of course, in other illustrative embodiments, process 1200 is performed with local positioning system information instead of global positioning system information. In such an illustrative example, the process receives local positioning system coordinates at operation 1202.

The process also determines whether the local positioning system coordinates are within a range of coordinates representing the specified distance from the portal at operation 1204. Responsive to a determination that the local positioning system coordinates are within the range of coordinates representing the specified distance from the portal, the process opens the portal at operation 1206.

The flowchart and block diagrams of the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the blocks may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in the flowchart or block diagram.

For example, the process in FIG. 6 may open the portal after unlocking the portal in operation 604. In another illustrative example, multiple methods of authentication with the portal may be required. In such illustrative embodiments, the process in FIG. 9 and the process in FIG. 10 may both be performed.

Additionally, the process in FIG. 8 may determine instead whether the robotic vehicle is at least a safe distance from the portal at operation 810. In an illustrative embodiment, the portal may swing through both sides. Thus, the process may determine whether the robotic vehicle is within the safe distance on either or both sides of the portal.

The different illustrative embodiments allow a robotic vehicle to access an area to which access is restricted by a portal by traveling through the portal without human intervention. The robotic vehicle may then operate when it is inconvenient for a human operator to be present, such as at night or while the operator is on vacation.

Thus, the different illustrative embodiments provide an apparatus, a system, and a method for managing a portal. The different illustrative embodiments provide an apparatus comprising a locking system, a detection system, and a portal access system. The locking system is for a portal having a first side and a second side. The portal is configured to swing about an axis through the first side between an opened position and a closed position. The detection system is configured to detect when a robotic vehicle is located within a selected distance of the portal. The portal access system unlocks the portal when the portal is in the closed position and the robotic vehicle is detected within a selected distance of the portal using the detection system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:

locking system for a portal having a first side and a second side, wherein the portal is configured to swing about an axis through the first side between an opened position and a closed position;

a detection system configured to detect when a robotic vehicle is located within a selected distance of the portal; and a portal access system that unlocks the portal when the portal is in the closed position and the robotic vehicle is detected within a selected distance of the portal using the detection system, wherein the portal access system comprises:

a portal movement system, wherein the portal movement system moves the portal between the opened position and the closed position; and a controller associated with the portal access system, wherein the controller unlocks the portal when the robotic vehicle is detected within the selected distance of the portal and the portal is in the closed position and moves the portal to the opened position from the closed position, wherein the controller determines whether a number of unauthorized objects are present within an unauthorized distance, determines whether the portal is in the opened position or the closed position responsive to the number of unauthorized objects being present within the unauthorized distance, closing the portal responsive to the portal being in the opened position, and keeping the portal closed until the number of unauthorized objects are no longer present within the unauthorized distance responsive to the portal being in the closed position and the robotic vehicle being present within the selected distance.

2. A portal access system comprising:

a portal movement system that moves a portal between a closed position and an opened position, wherein the portal has a first side and a second side and the portal swings about an axis through the first side between the opened position and the closed position;

a wireless communications unit configured to receive a request to move the portal from a robotic vehicle;

a detection system configured to detect when the robotic vehicle is located within a selected distance of the portal, wherein the detection system detects objects in an area in which the portal access system is located; and a controller, wherein the controller controls the portal movement system to move the portal between the opened position and the closed position in response to receiving the request using the wireless communications unit and in response to detecting the robotic vehicle within a selected distance of the portal using the detection system, wherein the controller identifies a number of unauthorized objects from the objects, and wherein the controller, in response to receiving the request and detecting the number of unauthorized objects when the portal is in the closed position, controlling the portal movement system to keep the portal in the closed position, wherein in controlling the portal movement system to keep the portal in the closed position, the controller controls the portal movement system to keep the portal in the closed position until the number of unauthorized objects are absent.

3. A method for managing a portal, the method comprising:

determining whether a robotic vehicle is within a selected distance of the portal, wherein the portal has a first side and a second side and the portal is configured to swing about an axis between an opened position and a closed position;

responsive to a determination that the robotic vehicle is within the selected distance of the portal, opening the portal;

determining whether a number of unauthorized objects are present within an unauthorized distance from the portal;

responsive to the number of unauthorized objects being present within the unauthorized distance, determining whether the portal is in the opened position or the closed position;

responsive to the portal being in the opened position, closing the portal; and responsive to the portal being in the closed position and the robotic vehicle being present within the selected distance, keeping the portal closed until the number of unauthorized objects are no longer present within the unauthorized distance.

* * * * *